Figure 2:
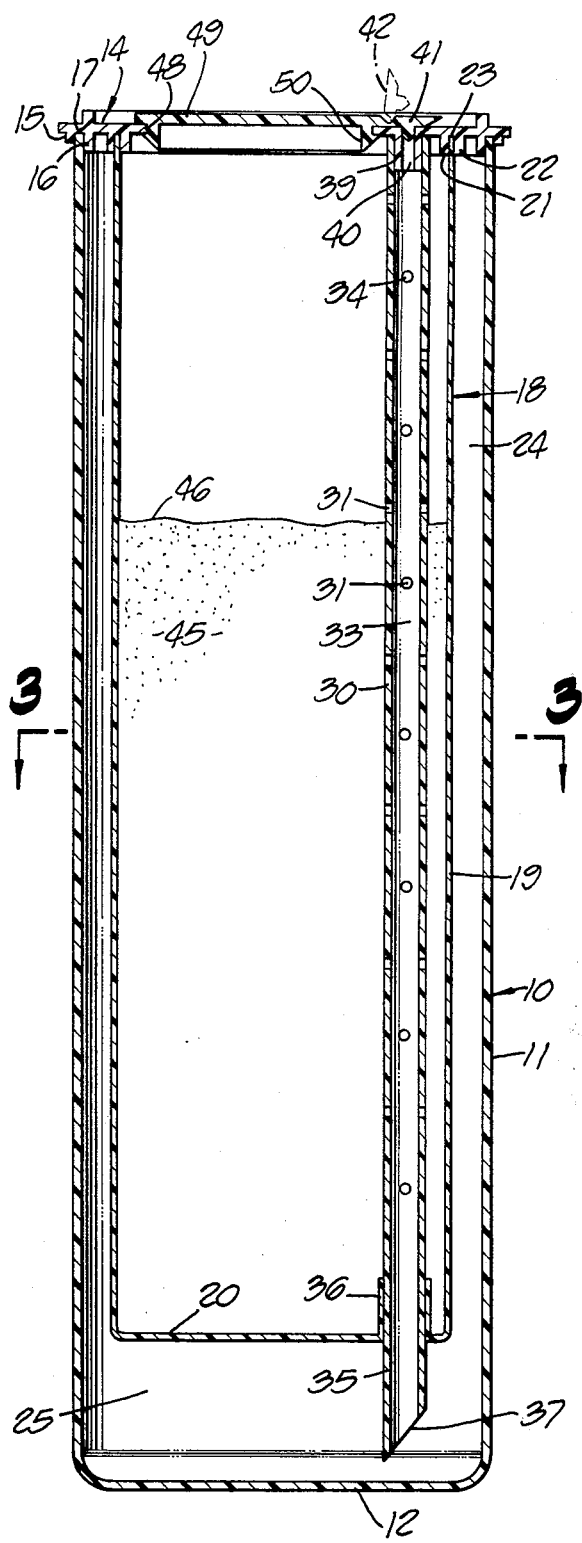
Figure 1:
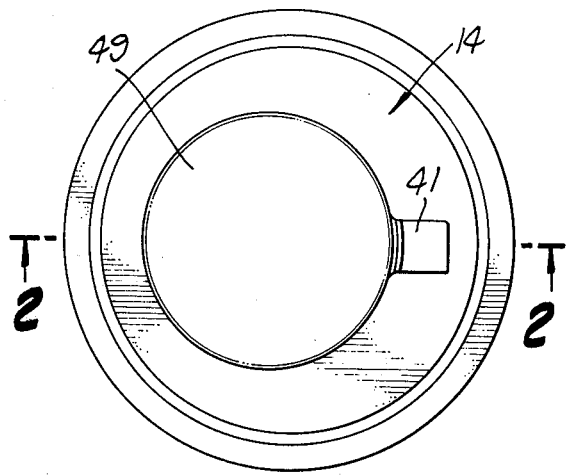
Figure 3:
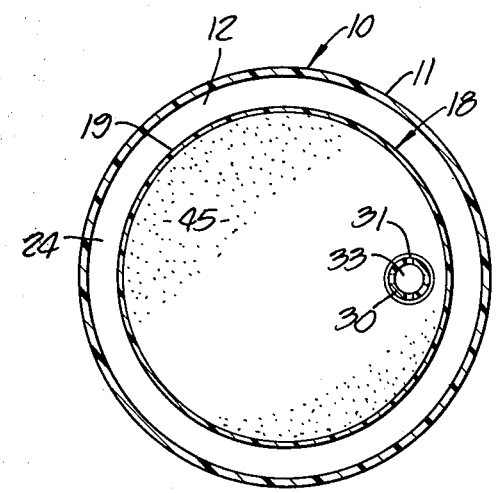

United States Patent [19]
McRoskey et al.

[11] 3,904,087
[45] Sept. 9, 1975

[54] COMPARTMENTED POWDER DISPERSING DEVICE

[76] Inventors: John W. McRoskey, 428 Homewood Rd., Los Angeles, Calif. 90049; Delbert D. Swartz, 4808 Asteria St., Torrance, Calif. 90503

[22] Filed: Oct. 11, 1974

[21] Appl. No.: 514,122

[52] U.S. Cl. .................................. 222/193; 222/203
[51] Int. Cl. ............................................. B67d 5/54
[58] Field of Search ............ 222/193, 195, 95, 203, 222/211, 209

[56] References Cited
UNITED STATES PATENTS
2,331,842   10/1943   Moran .................................. 222/193

*Primary Examiner*—Robert B. Reeves
*Assistant Examiner*—Hadd Lane
*Attorney, Agent, or Firm*—Whann & McManigal

[57] ABSTRACT

A powder or other material dispersing device comprising a two-compartment container consisting of an outer container and an inner plastic bag partly filled with material, there being an air space between the outer compartment and the inner bag. Extending through the inner bag is a tube having openings in communication with the interior of the inner bag, one end of the tube opening into the outer container and the other end connected to a nozzle through which the dispersion may occur. Upon squeezing the container air is forced through the tube and the material in the inner bag is agitated whereby the material is sucked by venturi action into the tube and dispersed through the nozzle dispersing the powder in the form of a powder air dispersion or in the form of a cloud having the material evenly dispersed therein.

6 Claims, 3 Drawing Figures

PATENTED SEP 9 1975

3,904,087

COMPARTMENTED POWDER DISPERSING DEVICE

BACKGROUND OF THE INVENTION

It is common practice to spray or dust plants to kill insects or bugs. One type of device is a pump type having a cylinder and piston arrangement in connection with a reservoir, and when the pump is operated a stream of air under pressure sucks the material from the reservoir and sprays it or disperses it on the plants. This type of device requires the use of both hands to operate and it is difficult sometimes to direct the spray or dispersion where it is most needed.

Another type of device of the class described is a squeeze-type container wherein the operator squeezes the container which forces the material which may be powder or liquid through an outlet opening. This latter device is objectionable because the material often comes out in slugs, which are ecologically unacceptable, rather than uniform dispersion and deposits the material unevenly on the plant, getting too much material in some places and no material in other places. Also, such devices are subject to clogging.

Such a device, as known to applicants, can be operated only in a substantially downright position.

The art known to applicants is disclosed in the following U.S. Pat. Nos.: Adams, 535,439; Tefft 1,609,674; Moran 2,331,842; Gallagher 2,408,058; Bouet 3,223,289; Kratzer, et al. 3,054,210.

SUMMARY OF THE INVENTION

It is the object of applicants' present invention to provide a material dispersing container or apparatus which preferably works with a powder, which may be operated in one hand and evenly disperses the material in the form of a dust air dispersion in which the material is evenly distributed. Our invention is not subject to clogging; and is dependable in its operation.

It is an object of this invention to provide such a device which may be operated in an upright position, an inverted position, or in a tilted or horizontal position. This makes the device usable in such a way that the operator may reach in between the plants, holding the dispersing device in such a position as will adequately reach portions of the plant or plants which need the powder applied thereto.

The invention of applicants' invention is low in cost, easy to refill and easy to clean.

Other objects and particular features of the invention will be pointed out in the following detailed description of a preferred form of the invention.

BRIEF DESCRIPTION OF THE DRAWINGS

FIG. 1 is a vertical sectional view through applicant' invention;

FIG. 2 is a horizontal sectional view taken along the line 2—2 of FIG. 1; and FIG. 3 is a horizontal sectional view taken along the line 3—3 of FIG. 1.

DESCRIPTION OF THE PREFERRED EMBODIMENT

Referring to the drawings, there is an outer cylindrical container 10, including a cylindrical wall 11 and a bottom wall 12. The container 10 may be of other cross-sectional shapes to more conveniently fit a small hand. The container is preferably made from a deformable or flexible material so that it can be squeezed by the hand and it is necessary that the container have at least a substantial portion thereof which has the qualities of flexibility so that it can be squeezed in order to reduce the volumetric size of the interior of the container.

It has been found that polyethylene of a thickness of three hundredths of an inch is satisfactory.

The invention provides an end plate or cover 14 which is somewhat rigid and has a pair of annular depending flanges 15 and 16 which form an annular groove 17 which receives the end of the container 10 and holds that portion of the container rigidly cylindrical.

Within the container 14 is a bag 18 which has a cylindrical wall 19 and a bottom wall 20.

The upper open end of the bag 18 extends into a groove 20 provided by depending flanges 21 and 22 which hold the end of the bag in a cylindrical shape.

It will be noted that the bag 18 is of smaller diameter than the container and provides a surrounding air space 24. Also, the bottom 20 is spaced from the bottom 21 and provides an end chamber 25, these chambers 24 and 25 being normally filled with air.

The bag 18 is relatively flexible and it is made from a plastic material such as polyethylene, and the walls thereof are about three thousandths of an inch thick.

Extending through the bag from one end to the other end thereof, and spaced a short distance from the cylindrical wall of the bag 18, is a tube 30 which is also made from a flexible material so that it will bend under pressure. However, like the other elements, it has the quality of returning to its original or normal shape when pressure is removed.

The portion of the tube within the bag has a series of openings 31 which connect the interior of the bag to an axial air passage 33 of the tube 30. Lower end 35 of the tube extends downwardly through the bottom wall 20 of the bag and a seal is formed at that point by means of the collar 36.

The lower end of the tube 35, which is located in the chamber 25, is cut at an angle 37 so that it will not be closed should the bottom wall of the bag be deformed.

The upper end of the tube extends over the adheres to a cylindrical nipple 39 which depends from the end plate 12 and has an opening comprising a nozzle 40 which communicates with the exterior of the device when the cover portion 41 is moved into dotted line position 42.

The interior of the bag 18 may be partially filled with a material such as dusting powder 45, preferably to a level which approximates the line 46. This may be done through a cylindrical opening 48 in the end plate 14, which is normally closed by a lid 49 removably secured in place by the externally grooved annular projection 50.

With the cover 41 in an open position and the bag 18 filled with dusting powder or a granular material or some other material which it is desired to apply to plants, the operator may take the device in one hand, the diameter thereof being convenient to do this, and give the device a squeeze. This will reduce the volume within the container 10 and will force air through the passage 33. At the same time the bag 30 is deformed and the material 45 in the bag is disturbed so that the surface thereof is agitated and this agitation of the material loosens it or frees it so that the suction or venturi action created by the forcing of the air through the passage 33 will draw the dust into this passage through the openings 31 and send it through the nozzle 40.

The dispersion which is forced through the nozzle 40 is one in which the powder is evenly distributed and is in the form of a dust which will evenly cover an area and when directed toward a plant will surround a portion of the plant with the dust falling on or adhering to the leaves, stem and tendrils.

If the plant is somewhat bushy, the operator may reach into the plant and perform the squeezing operation and the dusting will occur as before. The operator may turn the device on its side and the same operation will occur. Likewise, the operator may invert the device and the same operation will occur. If the device is inverted the powder 45 drops to the end of the bag, which is secured to the end plate and opposite end of the bag will have the air space in which the agitation of the material occurs. The material in the bag will be agitated and the air and its velocity through the passage 33 will readily suck the powder or granular material into the air passage and send it through the nozzle and form a powderair dispersion or dust.

Because of the flexibility of the various parts, when the operator releases his grip the container, the bag, and the tube will return to their normal positions.

From the foregoing, it will be obvious that it is only necessary to use one hand to perform the spray or dusting operations. Also, it is emphasized that when the device is squeezed two actions take place — one is to force the blast of air outwardly through the air passage 33, and the other is the agitation of the powder in the bag which produces a loosening of the powder and a very heavy or a saturated dust which is entrained and sucked through the openings 31.

In practice it is preferable that there not be so much powder that there will not be an air space in the bag and that all of the openings in the tube 30 will be closed but that at least a portion of them will be open so that the venturi action may occur.

This arrangement has proven to be extremely satisfactory and successful in forming a relatively even dispersion of the powder in the air and will not cause a solid stream of powder to be discharged through the nozzle 40.

We claim:

1. A dispersing device of the character described, the combination including:
   a. a container having a portion thereof which is deformable in part and which when squeezed will deform and decrease the volume of the interior thereof;
   b. a bag in said container, said bag being of smaller size than said container so as to leave an air space in the container, the interior of said bag being at least partly filled with a material adapted to be dispersed therefrom;
   c. an outlet tube having an air passage, said tube extending through said bag and having openings in the wall thereof communicating between the interior of said bag and said air passage, one end of said air passage being in communication with the air space in said container and the other end of said air passage being in communication with the exterior of the dispersing device; and
   d. said parts being so formed that the squeezing of said container causes air to be forced from said container through said air passage of said tube, and said air flow through said passage causing a suction or venturi action which draws said material into said air passage and discharging it to the exterior in the form of a dispersion of material in air.

2. A combination as defined in claim 1 in which the material in said bag is a powder which is drawn into said passage and mixed with air to form a dust for ready application to plants and the like.

3. A combination as defined in claim 1 in which when said container is squeezed and deformed said bag is also deformed in order to agitate the material in said bag to enable it to more readily enter said air passage in order to form the dispersion or cloud of material which is carried through the outlet end of the tube.

4. A combination as defined in claim 1 in which air space around said bag in said container is formed at the end of said container and said air space also at least partly surrounds said bag.

5. A combination as defined in claim 4 in which said container and said bag are secured to a relatively rigid end plate and in which said air tube is also secured to said plate at one end and at the other end extends through the bottom of said bag so that its entrance opening is connected to the air space in said container and the exit part of the air passage in said tube is connected to the exterior of said device through said end plate.

6. A combination as defined in claim 5 in which said end plate has an opening through which said bag can be filled or partly filled, there being a lid for closing said opening.

* * * * *